Patented Nov. 23, 1937

2,099,672

UNITED STATES PATENT OFFICE 2,099,672

ANTHRAQUINONYL THIAZOLES

Earl Edson Beard, Milwaukee, Wis., assignor to E. I. du Pont de Nemours & Company, Wilmington, Del., a corporation of Delaware No Drawing. Application June 7, 1934, Serial No. 729,441

8 Claims. (Cl. 260—44)

This invention relates to carbon compounds and to processes for their production. More particularly it relates to the preparation of derivatives of 1-nitro-anthraquinone-6-carboxylic acid. It especially appertains to the substances produced by the reaction or condensation of carbon compounds having amino and mercapto radicals in adjacent positions with 1-nitro-anthraquinone-6-carbonyl halides. Such products probably have the formula

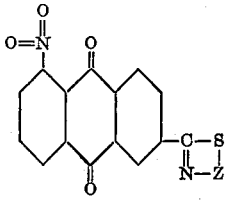

in which Z represents a carbon compound radical, residue or nucleus.

Eckert in 1914 (Monats. für Chemie. 35 289) showed that by nitrating anthraquinone-beta-aldehyde and oxidizing the resultant nitro-anthraquinone-aldehyde that the compound 1-nitro-anthraquinone-6-carboxylic acid is produced.

It has now been found that new chemical compounds, new vat dyes, new colored carbon compounds, new vattable compositions of matter and new intermediates may be produced by condensing (or reacting) carbon compounds especially cyclic carbon compounds having amino and mercapto radicals in ortho (or adjacent) positions with 1-nitro-anthraquinone-6-carbonyl halides.

This invention has for an object the preparation of new and valuable chemical compounds. Other objects are the preparation of carbon compounds in a very desirable physical form and in a high state of purity. Still further objects are to produce new vat dyes, new intermediates, new derivatives of 1-nitro-anthraquinone-6-carboxylic acid and to devise new chemical processes.

A general advance in the art and other objects which will appear hereinafter are also contemplated.

The foregoing objects and related ends are accomplished in the manner set out in the following description in which details of what is believed to be the best mode for carrying out the invention are disclosed.

Specifically one method for accomplishing the aforementioned objects and obtaining the newly discovered products is by treating 1-nitro-anthraquinone-6-carboxylic acid in such a way as to produce a 1-nitro-anthraquinone-6-carbonyl halide and thereafter treating the resultant compound with an ortho-amino-mercapto carbon compound until a reaction has occurred and a thiazole has been formed. In some instances the 1-nitro-anthraquinone-6-aldehyde may be used advantageously in the place of the corresponding acid halide. If the aldehyde is used the condensation is carried out in an acid condensing medium such as concentrated sulfuric acid.

The invention will be further understood from a consideration of the following detailed description and specific examples in which the quantities are given by weight.

PREPARATION OF 1 - NITRO-ANTHRAQUINONE - 6 - CARBONYL HALIDES

Example I

Ten (10) parts of 1-nitro-anthraquinone-6-carboxylic acid were suspended in 100 parts of benzene. Ten (10) parts of phosphorus pentachloride were added to the suspension and the whole heated at 80° C. for one hour. The reaction mixture was then cooled to 15° C. and filtered. The cake of the acid chloride was washed with benzene and dried.

The conversion of the acid (or its metal salt) to the carbonyl halide may be carried out in other solvents or suspension agents for example, ortho-di-chloro-benzene, nitrobenzene, toluene, mono-chloro-benzene and the tri-chloro benzenes or suitable mixtures of the compounds listed; and at other temperatures depending upon the particular agent used. Good results are also obtainable with solvent naphtha as a suspension agent. Particular mention may be made of thionyl chloride as an agent for the conversion to the desired compound. While any particular carbonyl halide may be produced especially good results are obtainable in the case of the chloride and the bromide. If desired the phosphorus penta-halide may be prepared in the solvent to be used later for the conversion of the carboxylic acid to carbonyl halide. This may be accomplished for example by adding phosphorus tri-chloride to the solvent and then passing a stream of chlorine gas through the solution until the theoretical amount has been added or absorbed according to the equation:

$$PCl_3 + Cl_2 \rightarrow PCl_5$$

TREATMENT OF 1 - NITRO - ANTHRAQUINONE - 6 - CARBONYL HALIDES WITH ORTHO-AMINO-MERCAPTAN COMPOUNDS

*Example II*

Ten (10) parts of 1-nitro-anthraquinone-6-carbonyl chloride and 6.4 parts of 4-amino-5-mercapto-phenetole were heated together in 100 parts of nitrobenzene at 140°–160° C. for 1 to 2 hours. The reaction mass was cooled, diluted with 100 parts of alcohol and filtered cold. The condensation product gives a yellow sulfuric acid solution color.

Satisfactory results are obtained in the above procedure when a metal salt of the mercaptan compound is used in the place of the mercaptan itself. Particular mention may be made of the alkali metal salts and the zinc salts.

In like manner, condensations may be carried out with related compounds such as 2-mercapto-aniline, 1-amino-2-mercapto - naphthalene, 3-amino-2-mercapto - naphthalene, 2-methyl - 6-mercapto-aniline, 4-chloro-6-mercapto-aniline, 2-mercapto-3-methoxy-aniline and 2-methyl-4-chloro-6-mercapto-aniline.

*Example III*

Ten (10) parts of 1-nitro-anthraquinone-6-carbonyl chloride and 8.5 parts of 1-mercapto-2-amino-anthraquinone were heated together in 100 parts of nitrobenzene at 150°–180° C. for 1 to 2 hours. The reaction mass was cooled, filtered at 80° C., washed with nitrobenzene and alcohol and dried. The condensation product produces a red-brown sulfuric acid solution color and a Bordeaux alkaline hydrosulfite vat. The same product which in this case is thought to be 5'-nitro-1:(S)2:2'- di - anthraquinonyl - thiazole was also produced by carrying out the above procedure upon the sodium salt of the mercaptan as a starting material. In like manner, proportionate quantities of 1:5-di-mercapto-2:6-di-amino-anthraquinone, 1:8-di-mercapto-2:7-di-amino-anthraquinone, 2-mercapto-3-amino-anthraquinone and Bz-2-amino-Bz-1-mercapto-benzanthrone may be treated.

*Example IV*

Ten (10) parts of 1-nitro-anthraquinone-6-carbonyl chloride and 8.5 parts of the sodium salt of 1-mercapto-2-amino-3-chloro - anthraquinone were heated together in 150 parts of nitrobenzene at 160°–180° C. for 2 to 3 hours. The reaction mass was filtered and theated as in Example III. The isolated product gives Bordeaux hydrosulfite vats and dissolves in concentrated sulfuric acid with a brown color.

The corresponding 3-bromo-mercaptan may be similarly treated. In like manner di-ortho-mercapto-benzidines for example the para-amino-compound may be utilized.

The invention is not limited to condensations involving the particular amino-mercapto compounds mentioned above. In the general formula Z may represent any radical containing a carbon atom. Of such compounds those in which the amino and mercapto substituents are attached to a benzene nucleus merit special mention.

Especially good results have been obtained utilizing nitrobenzene as a solvent or suspension medium for carrying out the above described reaction. Other solvents, for example, chlorinated benzenes, solvent naphtha and other inert organic solvents, having a boiling point approximating the range 150°–225° C. or mixtures of the same may be used if desired. The choice of solvent or suspension agent for carrying out the reaction depends largely upon the particular substances being reacted and the convenience of the person carrying out the reaction. This factor may readily be decided by one skilled in the art.

The length of time during which the reactions are heated is not critical since heating after the completion of the reaction is not detrimental to the final product. The time for completion of the reaction depends to some extent upon the particular reactants. It may readily be determined empirically in any specific case.

Although not generally preferred 1-nitro-6-omega-di-halogen (for example chlorine)-methyl-anthraquinone is regarded as a chemical equivalent for use in preparing the compounds of this invention.

While it is not desired to limit the invention to any particular theory, it is believed that when the carbonyl halide is brought into contact with the ortho-amino-mercapto compound the formation of the thiazole ring takes place in two steps. In the first step, it is believed that a carbonyl sulfide is formed. Thereafter in a second step, water is split out with the formation of the desired ring. The formation of the carbonyl sulfide takes place very readily, even at moderate temperatures and in the absence of a solvent, for example, by vigorously grinding the reactants in a mortar. In the second step, in which the splitting out of water takes place, temperatures high enough to accomplish this result, should be used. Generally speaking the temperature may vary from 100° C., that is a temperature which will split out water, to the boiling point of the solvent, but preferably temperatures below 140° C. and above 200° C. are not utilized. Higher temperatures are possible in pressure apparatus. The prefered temperature range in any instance may be readily determined by the individual carrying out the reaction.

As indicated in the examples, hot filtrations are some times desirable since they tend to effect a purification of desired product.

The compounds produced by this invention are colored and are valuable for the purpose of coloring various substances. These materials are also valuable as intermediates for vat and anthraquinone dyes.

As many apparently widely different embodiments may be made of this invention it is to be understood that I do not limit myself to the specific embodiments thereof except as defined in the appended claims.

I claim:

1. The process of making thiazoles which comprises condensing a 1-nitro-anthraquinone-6-carbonyl halide with a carbon compound containing a benzene nucleus having amino and mercapto groups in adjacent positions thereon.

2. The products which have the formula:

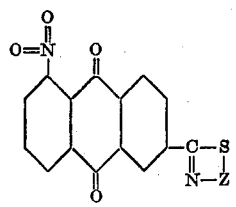

in which Z represents a carbon compound containing a benzene nucleus, ortho positions of said benzene nucleus being attached to the N and S atoms of the thiazole ring.

3. The process which comprises heating together 1-nitro-anthraquinone-6-carbonyl halide and 1-mercapto-2-amino-anthraquinone to form 5'-nitro-1,(S)2,2'-di-anthraquinonyl thiazole.

4. The process of preparing 5'-nitro-1,(S)2,2'-di-anthraquinonyl thiazole which comprises heating 10 parts of 1-nitro-anthraquinone-6-carbonyl chloride and 8.5 parts of 1-mercapto-2-amino-anthraquinone together in 100 parts of nitrobenzene at 150°–180° C. for 1–2 hours, cooling the reaction mass to 80° C., filtering at that temperature and washing with nitrobenzene and alcohol, which product produces a red-brown sulphuric acid solution color and a Bordeaux alkaline hydrosulfite vat.

5. A chemical compound having the formula:

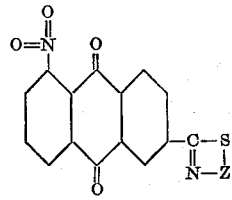

in which Z represents the nucleus of a carbocyclic carbon compound.

6. The vat colors having the formula

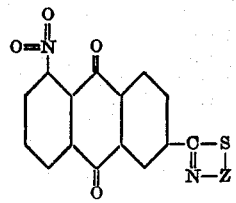

in which Z represents a benzene residue joined through ortho positions to the N and S atoms of the thiazole ring.

7. The vat colors having the formula

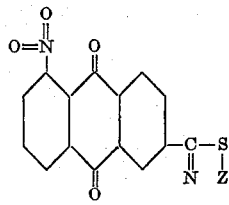

in which Z represents an anthraquinone residue.

8. The process of preparing thiazoles having the formula

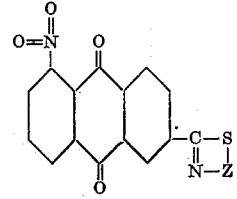

in which Z represents a carbon compound containing a benzene nucleus, ortho positions of said benzene nucleus being attached to the N and S atoms of the thiazole ring, which comprises condensing a 1-nitro-anthraquinone-6-carbonyl halide with a carbon compound containing a benzene nucleus having amino and mercapto groups in adjacent positions thereon.

EARL EDSON BEARD.

Certificate of Correction

Patent No. 2,099,672.                        November 23, 1937.

EARL EDSON BEARD

It is hereby certified that errors appear in the printed specification of the above numbered patent requiring correction as follows: Page 2, first column, line 64, Example IV, for "theated" read *treated;* page 3, second column, line 22, claim 7, in the formula, for
$$\begin{array}{c}-\text{C}-\text{S}\\ \parallel\\ \text{N}\quad\text{Z}\end{array} \text{ read } \begin{array}{c}-\text{C}-\text{S}\\ \parallel\\ \text{N}-\text{Z}\end{array};$$

and that the said Letters Patent should be read with these corrections therein that the same may conform to the record of the case in the Patent Office.

Signed and sealed this 22nd day of February, A. D. 1938.

[SEAL]                                        HENRY VAN ARSDALE,
*Acting Commissioner of Patents.*